M. GZUPKAYTIE.
PIPE COUPLING.
APPLICATION FILED NOV. 16, 1915.
1,175,438.
Patented Mar. 14, 1916.
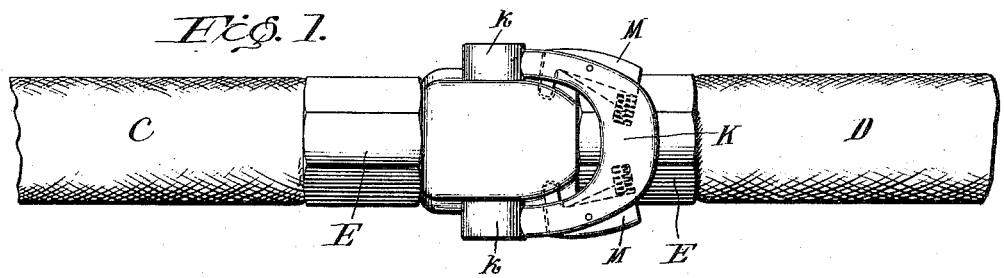
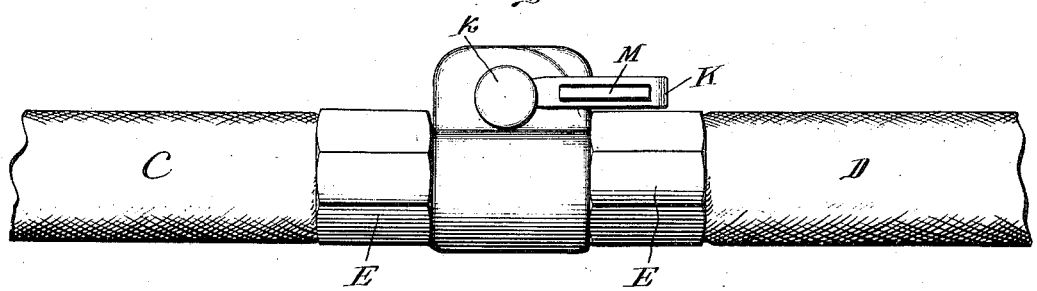
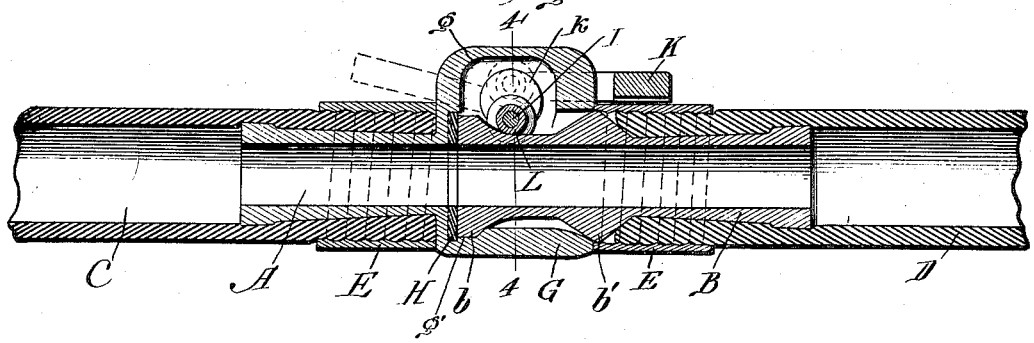
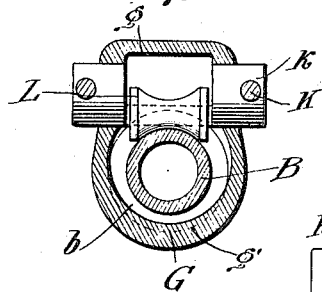
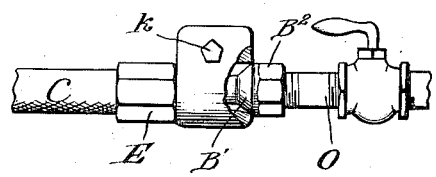
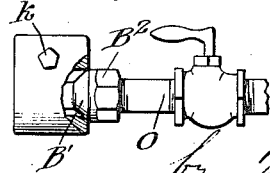
Inventor
Matt Gzupkaytie
Witnesses

UNITED STATES PATENT OFFICE.

MATT GZUPKAYTIE, OF ROSLYN, WASHINGTON.

PIPE-COUPLING.

1,175,438.          Specification of Letters Patent.     Patented Mar. 14, 1916.

Application filed November 16, 1915. Serial No. 61,766.

*To all whom it may concern:*

Be it known that I, MATT GZUPKAYTIE, a citizen of the United States, and resident of Roslyn, county of Kittitas, State of Washington, have invented certain new and useful Improvements in Pipe-Couplings, of which the following is a specification.

The present invention relates to an improvement in pipe couplings and has for its object to provide a coupling by which two sections of pipe may be quickly united or detached or a pipe connected with a stationary stand pipe, plug, or supply pipe.

In the accompanying drawings, Figure 1 is a plan of a coupling constructed in accordance with the present invention showing the same employed for connecting together two lengths of hose. Fig. 2 is a side elevation. Fig. 3 is a longitudinal sectional view. Fig. 4 is a transverse section on the line 4—4 of Fig. 3. Fig. 5 is a view showing the coupling adapted for connecting a hose with a stationary plug or supply pipe. Fig. 6 illustrates a cap or closure for a fire plug outlet secured in position in accordance with the present invention.

Referring to the drawings it will be seen that the coupling comprises two tubular members A, B, each of which is adapted to be connected by any suitable means with a section of pipe. In the embodiment of the invention illustrated where the coupling is employed for connecting two lengths of hose C, D each of said members has a tapered body over which the hose is adapted to pass and an internally threaded sleeve E is provided for clamping the hose firmly against said tapered section. The opposite ends of the sections A, B are of slightly greater diameter than the intermediate portions about which the clamping rings E extend and the member A is provided at its opposite end with an enlarged section G which is adapted to surround and receive one end of the coupling member B.

The enlarged section G of the coupling member A is of such form that it provides a seat or bearing for a washer H, against which the end of the coupling member B is adapted to be securely held by means to be hereinafter described. The outer face of the end wall of section G also forms an abutment against which the end of the hose C and adjacent sleeve E bear.

The end of the coupling member B which is adapted to be inserted in the enlarged section G of the member A has its outer surface made concave in the direction of its length, the relatively enlarged portions b, b' thereof being adapted to respectively bear against the seat formed about the bore of the member A and the mouth of the enlarged section G when the two members of the coupling are in coupled relation.

As shown the two coupling members are held together by a cam lock which comprises a bar or rod I extending transversely across the interior of the enlarged section G at one side of the coupling member B therein, the ends of said rod being eccentrically attached to studs k rotatably mounted in opposite walls of the section G and secured to the ends of the arms of a yoke K. On the bar or rod I is mounted an anti-friction roller L which is, as shown in Fig. 4, of such form as to fit closely against the exterior surface of the coupling member B when the yoke K is turned into the position shown in full lines in the drawings. By turning the yoke into the position indicated in dotted lines it will be seen that the rod I and pressure roll L thereon will be moved laterally of the coupling member B into a chamber g provided therefor in the enlarged section G and out of the path of the member B so that the latter can be readily withdrawn from or inserted in the section G of the member A. As the yoke or operating lever K is turned to the position shown in full lines the cam action of the roller L will cause the inserted end of said member B to be forced closely against the seat about the bore of the member A, or the washer H therein, and into a groove g' in the opposite wall of the section G. This insures a liquid-tight joint between the members of the coupling and accidental displacement of the lock is prevented by the action of two spring pressed pawls M which are pivotally mounted on the arms of the yoke-like lever K and the free ends of which are adapted to enter sockets in the outer surface of the walls of the enlarged section G when the lock is in position to hold the members of the coupling together. To release the coupling it is only necessary to shift the pawls M against the action of their springs to withdraw the points thereof from engagement with the section G when the lever can be easily turned and the locking roll withdrawn from engagement with the coupling member B.

While as hereinbefore described, and shown in Figs. 1 to 4 of the drawing, the improved coupling is particularly adapted for connecting two lengths of hose, it will be evident that the same may be employed for connecting a hose with a stand-pipe or plug. Such embodiment of the invention is illustrated in Fig. 5 in which the member B' of the coupling is provided at its outer end with an internally threaded section B² to receive a threaded portion O of a suitable supply pipe. In this embodiment of the invention the rotary studs $k$ are not connected by a yoke but the outwardly projecting portions thereof are made of polygonal form in cross section to receive a suitable wrench by which the cam lock can be moved to and from operative position. The shape of the studs will conform to that of the projection of the cap commonly employed for closing the outlet O of a fire plug so that the wrench employed for removing that cap may be used to attach and detach the coupling.

The several parts of the coupling may be made of any suitable material, such as brass, which will not be affected by the action of the liquid passing through the pipes to which it is applied and it will be evident that the device can be quickly attached or removed. The parts of the lock with the exception of the operating handle which as shown in Fig. 5 need not be employed in every case, being all contained within the body of the coupling are protected from injury and the exterior operating member K is of such form that it lies close against the pipe, within the planes of the section G so that it will not interfere with easy manipulation or movement of the connected pipes.

As shown in Fig. 6 the outlet O of a standpipe or fire plug provided with a coupling member B' may be closed by a cap corresponding to the enlarged section G of the coupling member A containing a cam lock like that hereinbefore described.

Having thus described the invention, what is claimed and desired to be secured by Letters Patent is:

1. A pipe coupling comprising two tubular members one having at one end an enlarged section providing an annular seat about the bore of said member and adapted to receive one end of the other member, a cam lock supported solely by the first said member and arranged within said enlarged section so that it may be moved to and from a position where it will engage the inserted member and hold its end against said seat, and a latch movable with the cam and adapted to positively engage the coupling when the lock is operative to prevent accidental displacement thereof.

2. In a pipe coupling, the combination of two tubular members one having at one end an enlarged section adapted to receive and surround one end of the other member, an eccentrically mounted pressure device arranged within the enlarged section of the first said member, means for rocking said device to and from a position where it will engage the interior coupling member, and means for retaining the pressure device in said engaging position.

3. In a pipe coupling, the combination of two tubular members one having at one end an enlarged section adapted to receive and surround one end of the other member, a pressure roll mounted within the enlarged section of the first said member on an axis extending transversely of the coupling, and means for moving said roll to and from a position where it will engage the inner coupling member.

4. A pipe coupling comprising two tubular members one having at one end an enlarged section and the other having one end adapted to enter said enlarged section, a cross rod eccentrically mounted in the side walls of the enlarged section, a roll mounted to turn on said rod and adapted to conform to the transverse curve of the exterior of the member inserted in said enlarged section, and means for moving said rod to carry the roll to and from a position where it will engage said inserted member.

In testimony whereof I affix my signature.

MATT GZUPKAYTIE.